(12) United States Patent
Yamamoto et al.

(10) Patent No.: US 8,679,826 B2
(45) Date of Patent: Mar. 25, 2014

(54) METHOD FOR RECYCLING PAPER PRODUCTS COATED WITH POLYESTER POLYMERS

(75) Inventors: Motonori Yamamoto, Mannheim (DE); Andreas Kuenkel, Neustadt (DE); Gabriel Skupin, Speyer (DE); Rainer Blum, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/503,988

(22) PCT Filed: Oct. 25, 2010

(86) PCT No.: PCT/EP2010/066079
§ 371 (c)(1),
(2), (4) Date: Jul. 13, 2012

(87) PCT Pub. No.: WO2011/054694
PCT Pub. Date: May 12, 2011

(65) Prior Publication Data
US 2012/0276619 A1 Nov. 1, 2012

(30) Foreign Application Priority Data

Oct. 26, 2009 (EP) .................................. 09174077

(51) Int. Cl.
*D21C 3/00* (2006.01)

(52) U.S. Cl.
USPC ........................................................ 435/278

(58) Field of Classification Search
USPC ............... 435/278; 162/8; 427/395; 428/514
See application file for complete search history.

(56) References Cited

U.S. PATENT DOCUMENTS

| | | | |
|---|---|---|---|
| 3,957,572 A | 5/1976 | Eriksson | |
| 5,889,135 A | 3/1999 | Warzelhan et al. | |
| 5,989,724 A * | 11/1999 | Wittosch et al. | 428/511 |
| 6,699,536 B2 * | 3/2004 | Katoh et al. | 428/32.28 |
| 2004/0023004 A1 | 2/2004 | Kimpimaki et al. | |
| 2010/0189706 A1 * | 7/2010 | Chang et al. | 424/94.4 |
| 2011/0187029 A1 * | 8/2011 | Dietrich et al. | 264/539 |
| 2012/0045622 A1 * | 2/2012 | Blum et al. | 428/178 |

FOREIGN PATENT DOCUMENTS

| | | |
|---|---|---|
| DE | 1 761 864 | 9/1971 |
| DE | 2 413 159 | 10/1974 |
| EP | 0 257 412 | 3/1988 |
| EP | 0 273 770 | 7/1988 |
| EP | 1 462 568 | 9/2004 |
| EP | 1 860 231 | 11/2007 |
| WO | 92 09654 | 6/1992 |
| WO | 96 15173 | 5/1996 |
| WO | 96 15174 | 5/1996 |
| WO | 96 15175 | 5/1996 |
| WO | 96 15176 | 5/1996 |
| WO | 96 21689 | 7/1996 |
| WO | 96 21690 | 7/1996 |
| WO | 96 21691 | 7/1996 |
| WO | 96 21692 | 7/1996 |
| WO | 96 25446 | 8/1996 |
| WO | 96 25448 | 8/1996 |
| WO | 98 12242 | 3/1998 |
| WO | 99 42490 | 8/1999 |
| WO | 2004 096566 | 11/2004 |
| WO | 2005 097353 | 10/2005 |
| WO | 2007 000420 | 1/2007 |
| WO | 2007 018368 | 2/2007 |
| WO | WO 2007/018368 * | 2/2007 |
| WO | 2007 145932 | 12/2007 |
| WO | 2008 142003 | 11/2008 |
| WO | 2010 034710 | 4/2010 |

OTHER PUBLICATIONS

Bruelmann, M., et al., "Polymers, Biodegradable," Wiley-VCH Verlag GmbH & Co KG, Weinheim, pp. 1-31, (2009).
International Search Report Issued Apr. 5, 2011 in PCT/EP10/66079 Filed Oct. 25, 2010.
U.S. Appl. No. 13/489,815, filed Jun. 6, 2012, Blum et al.
U.S. Appl. No. 13/503,988, filed Apr. 25, 2012, Yamamoto et al.

* cited by examiner

*Primary Examiner* — Ralph Gitomer
(74) *Attorney, Agent, or Firm* — Oblon, Spivak, McClelland, Maier & Neustadt, L.L.P.

(57) ABSTRACT

A method for recycling a paper product sized, coated, or both sized and coated with a polymer, including: pulping an aqueous wastepaper suspension including a paper product in the presence of a hydrolase, the paper product being a paper product sized and/or coated with a polyester to obtain an aqueous solution, which is a waste paper suspension including a mixture of paper fibers and the polyester, and separating the polyester from the wastepaper suspension to recycle the paper fibers of the paper product, wherein the polyester is a polyester having a melt flow rate according to EN ISO 1133 (190° C., 2.16 kg weight) of from 2 to 50 $cm^3$/10 min, and the hydrolase includes at least one of a carboxyesterase [3.1.1.1], a lipase [3.1.1.3], and a cutinase [3.1.1.74].

10 Claims, No Drawings

METHOD FOR RECYCLING PAPER PRODUCTS COATED WITH POLYESTER POLYMERS

CROSS REFERENCE TO RELATED APPLICATION

This application is a 371 of PCT/EP2010/066079, filed on Oct. 25, 2010, and claims priority to European Patent Application No. 09174077.9, filed on Oct. 26, 2009.

The present invention relates to a method for recycling paper products sized and/or coated with biodegradable polymers and to a method for sizing paper with biodegradable polymers and a paper product sized with biodegradable polymers.

Paper products coated with polymers have numerous applications, in particular in the case of paper varieties whose ink jet printability can be improved by the polymer coating, i.e. all graphic arts papers, natural papers, coated papers or board and cardboard. The polymer is applied to the surface of the paper, for example, as an aqueous dispersion or aqueous solution and the paper thus treated is dried.

These polymer dispersions or aqueous solutions of the polymers and the coating method for paper are widely described in the literature, inter alia in WO 2004/096566 A1, U.S. Pat. No. 6,699,536 and WO2008/142003 A1 and the respective publications cited therein.

Wastepaper and the reclaiming of wastepaper from paper products are of particular economic importance in the paper industry since, in this way, resources (pulp) can be protected. The term "wastepaper" is based on DIN 6730 and is accordingly defined as paper or board which are recycled in used or unused form from the production or processing and are to be returned as semifinished products to a manufacturing process. In Germany alone, the level of use of wastepaper in 2003, i.e. the proportion of wastepaper, based on total domestic paper production, was 65%. Usually, wastepaper is used as secondary raw material in paper and board production. However, wastepaper cannot be recycled as often as desired. With each cycle of utilization, the fibers become shorter due to mechanical load and, after about 4 to 6 cycles, lose the ability to bind again to form a sheet structure, which in turn has adverse effects on the paper strength. Moreover, the contamination of the recycled paper also increases with increasing cycles of utilization since inorganic and in particular organic contaminants, such as, for example, polymers, cannot be completely separated off and consequently accumulate.

The literature discloses a few methods which are concerned with the production of paper stock from wastepaper. These are substantially the so-called deinking process in which the paper fiber is reclaimed by removing the printing ink in an alkaline medium and the so-called pulping, the aqueous wastepaper suspension being concentrated if necessary and being mechanically pulped in a kneader and the impurities and polymers then being separated from the paper fiber by sorting (for example by means of screen baskets). Usually, only cardboards are recycled by means of pulping (in a so-called "repulper" (pulper) or drum disintegrator) with elimination of impurities and polymers. In the case of all other paper types, it is now usual for them first to be prepurified by pulping before they are fed to a deinking process.

The reclaiming of fiber material by means of pulping has long been known and is described, for example, in DE 1 761 864 and DE 2 413 159. The specific problem in the sorting for separating the impurities from the paper fiber is disclosed, inter alia, in EP 1 860 231 A2 and in EP 1 462 568 A1. The deinking process is disclosed, for example, in WO 2007/145932 A1.

Independently of the method of wastepaper treatment, the removal of impurities and of polymers with which the paper products are coated has long been inadequate. In particular, paper products coated with polymers are scarcely accessible to wastepaper recycling or accessible only with acceptance of problems since, during the papermaking process, the polymers from wastepaper lead to deposits, in particular on parts of the paper machine, and to reduced quality of the paper products produced. The deposition behavior of such polymers is increased in that as a rule they are poorly water-soluble or even water-insoluble and tend to agglomeration. Owing to the required purification work, this leads to regular downtime of the machines and in some cases even to loss of production during the production process.

Over and above the abovementioned papers whose ink jet printability is to be improved by the polymer coating, further paper products coated with polymers are known. These are used, for example, as paper bags for dry foods or for liquids, as cardboard cups, as beverage cartons and cartons for liquids. They are distinguished in that they firstly impart a certain dimensional stability to the paper product and secondly make the paper product impermeable to liquids and therefore easy to handle, in particular for the end user. Such paper products have therefore become established particularly in the food sector.

PE (polyethylene)-coated packagings and paper products have long been known, in particular in the areas for food (e.g. for beverages), cosmetics and cleaning agents, it being possible for the PE film to be applied as a very thin barrier coating on the inside, outside and/or between the various paper layers. Usually, such a paper product is coated with PE film at least on one of the two surfaces.

A disadvantage of the paper products coated with PE is that they are not accessible to reuse of the paper stock in the course of conventional recycling, but only in dedicated recycling plants. Such paper products are disposable materials and cannot be subjected to the conventional recycling methods, as is usual, for example, for other paper types, such as newspapers and magazine papers. Usually, paper products coated with PE must be incinerated since composting, too, is not possible.

Furthermore, coated packagings, in particular as beverage cartons, are known under the trade name Tetra Pak®. Here these too are carton packagings coated with plastics, which as a rule furthermore have an aluminum layer as a liquid-repelling layer. The recycling of the individual components of a Tetra Pak® packaging is also problematic. These must first be collected separately from the remaining household waste. According to the manufacturer's information, recycling of the Tetra Pak® packagings has been possible since 2008 through a novel plasma technique, in which, after comminution of the Tetra Pak® into small shreds, the board is first separated from the aluminum foil and the plastic covering with the aid of water. In the following step, the aluminum foil is separated from the plastic covering with the aid of a plasma jet without incinerating the plastic, it being possible thereby to separate the packaging virtually completely into all three constituents, board, plastic and aluminum.

A disadvantage of this method is that it is very expensive owing to the separate collection and separate recycling. In addition, according to the manufacturer's information, it will initially be carried out only in Brazil, so that it is inadvisable for environmental protection reasons.

In addition, all of said paper products, independently of their use as, for example, graphic arts papers, PE-coated paper products or Tetra Pak®, still comprise polymeric sizes. These sizes, which are disclosed, inter alia, in EP 0 273 770 B1, EP 0 257 412 B2, WO 99/42490 A1 and WO 2007/000420 A1 and in the literature cited therein, cannot be completely separated in the known recycling methods and, in the reclaiming process, lead to the same difficulties as the polymers with which the paper products were coated.

The methods known from the prior art for reclaiming paper fibers from paper products sized and/or coated with polymers therefore have disadvantages independently of the type and composition of the sizing and/or coating polymers, since the polymers frequently cannot be completely separated from the paper fiber. In particular, the abovementioned paper products which are coated with polymers and are used in the area of foods, cosmetics and cleaning agents are not accessible at all to recycling or can be recycled only in a very expensive manner.

It was therefore the object of the present invention to provide a method for recycling paper products sized and/or coated with polymers, in which the paper fiber is separated virtually completely from the polymer layer, and the paper fiber thus obtained can be subjected directly to the papermaking process.

Furthermore, it was the object of the present invention to provide a method for sizing paper products which are sized with polymers and can then be subjected to recycling with virtually complete separation of the paper fiber from the polymeric size. In addition, the sizing effect of the polymeric sizes should be comparable to the prior art.

The object is achieved by a method for recycling paper products sized and/or coated with polymers, in which the paper products sized and/or coated with polymers are initially taken in an aqueous wastepaper suspension, this wastepaper suspension a) is pulped in the presence of at least one hydrolase, b) is pulped in an alkaline medium, and/or c) is treated in an alkaline medium in a deinking process, and the polymers are then separated from the wastepaper suspension, the polymers being biodegradable polymers.

The object is furthermore achieved by a method for sizing paper, in which biodegradable polymers are used as polymeric size. These biodegradable polymers are suitable both as engine sizes and as surface sizes.

In the context of the present invention, the term "paper products" includes all types of paper, board and cardboard.

Suitable fibers for the production of these paper products are all qualities customary for this purpose, e.g. mechanical pulp, bleached and unbleached chemical pulp, paper stocks from all annual plants and wastepaper (also in the form of broke, both coated and uncoated). These fibers can be used either alone or as any desired mixture with one another for the production of the pulps from which the paper products are produced. Mechanical pulp includes, for example, groundwood, thermomechanical pulp (TMP), chemothermomechanical pulp (CTMP), pressure groundwood, semichemical pulp, high-yield chemical pulp and refiner mechanical pulp (RMP). For example, sulfate, sulfite and soda pulps are suitable as chemical pulp. Suitable annual plants for the production of paper stocks are, for example, rice, wheat, sugar cane and kenaf.

In the method according to the invention for recycling paper products sized and/or coated with biodegradable polymers, an aqueous wastepaper suspension is first prepared from these paper products. This wastepaper suspension, which as a rule has a wastepaper concentration of from 2 to 40% by weight, can a) be pulped in the presence of at least one hydrolase, b) be pulped in an alkaline medium and/or c) be treated in an alkaline medium in a deinking process, the biodegradable polymers being separated from the paper stock. In this way, the paper stock is virtually completely, preferably completely, reclaimed.

The embodiments a) and b) according to the invention are distinguished by the method of pulping of the wastepaper suspension. As described at the outset, water is added to the paper product during the pulping, in order first to obtain a wastepaper suspension, and this can be concentrated if necessary or pulped in unchanged concentration. For pulping, the wastepaper suspension is treated in a pulper or a drum disintegrator, the biodegradable polymers being separated from the paper product by mechanical action. At the same time, the paper product is comminuted. The polymeric residues are then separated from the comminuted paper product via sorting, e.g. via screen baskets.

In the embodiment a), the pulping of the wastepaper suspension is effected in the presence of a hydrolase. Suitable hydrolases [EC 3.x.x.x] are, for example, esterases [EC 3.1.x.x] and proteases [EC 3.4.x.x]. According to the invention, in particular carboxyesterases [3.1.1.1] and/or lipases [3.1.1.3] and/or cutinase [3.1.1.74] are used. Examples of these are lipase or cutinase from *Achromobacter* sp., *Aspergillus* sp., *Candida* sp., *Candida antarctica*, *Mucor* sp., *Penicilium* sp., *Geotricum* sp., *Rhizopus* sp., *Rhizopus arrhizus*, *Burkholderia* sp., *Pseudonomas* sp., *Pseudonomas cepacia*, *Thermomyces* sp., pig's pancreas or wheat germs and carboxyesterases from *Bacillus* sp., *Pseudonomas* sp., *Burkholderia* sp., *Mucor* sp., *Saccharomyces* sp., *Rhizopus* sp., *Thermomonospora fusca*, *Thermobifida fusca*, *Fusarium solani*, *Thermoanaerobium* sp., pig's liver or horse's liver. Further examples of hydrolases are polyhydroxyalkanoate depolymerase and/or proteinase K. According to the invention, at least one hydrolase is used, i.e. it is of course possible to use a single hydrolase from among said hydrolases or a mixture of two or more of said hydrolases. However, it is preferable to use only one of said hydrolases in the method according to the invention in the embodiment a).

The hydrolases can be used in free form, preferably in aqueous solution, or in immobilized form.

A lipase and/or cutinase from *Pseudonomas capacia*, *Burkholderia capacii*, *Candida antarctica* or *Rhizopus arrhizus*, *Thermomonospora fusca*, *Thermobifida fusca*, *Fusarium isolani*, in free form, preferably aqueous solution, or in immobilized form (for example Novozym® 435 from Novozymes A/S) is preferred in embodiment a) of the method according to the invention.

The total amount of the hydrolase used is as a rule from 0.001 to 40% by weight, frequently from 0.01 to 15% by weight, preferably from 0.1 to 5% by weight, based in each case on the total solution.

A particular advantage of the embodiment a) is that the biodegradable polymers are hydrolyzed by the use of the hydrolase and are thereby separated completely from the paper fiber, in particular both the polymeric sizes and the polymer coatings.

In another embodiment b) of the method according to the invention, the pulping of the waste paper suspension is effected in an alkaline medium, i.e. for example in a pH range from 8, for example from 8 to 12, preferably from 10 to 12. For adjusting the pH, a base which is preferably selected from the group consisting of the alkali metal hydroxides and alkaline earth metal hydroxides is added to the wastepaper suspension. Sodium hydroxide solution, potassium hydroxide solution, calcium hydroxide and magnesium hydroxide may be mentioned by way of example. Of course, other hydroxides are also possible, such as, for example, aluminum hydroxide. Sodium hydroxide solution is particularly preferably used.

A particular advantage of the embodiment b) is that the biodegradable polymers dissolve in the alkaline medium and are thereby separated completely from the paper fiber.

The embodiments a) and b) are moreover particularly advantageous for the direct recycling of paper broke. In the production of paper products, this so-called paper broke regularly results, this being a paper product having a lower, undesired quality. This quality-related production broke cannot be reused by the papermaker in the production process. Rather, this broke must be separated off and subjected to a recycling method described in the prior art. The embodiments a) and b) now make it possible for the papermaker to pulp his own paper broke on site in a pulper or a drum disintegrator. The paper fiber obtained in this way can be subjected directly to the process for the production of the paper product.

In the embodiment c) of the method according to the invention, the wastepaper suspension is treated in an alkaline medium in a deinking process.

By deinking, the person skilled in the art understands firstly the flotation deinking process and secondly the wash deinking process. According to the invention, both deinking processes can be carried out in the embodiment c). It is now usual for the wastepaper suspensions which are fed to a deinking process first to be pulped in order already to comminute the paper fiber at least partly.

According to the flotation deinking process, the hydrophobized particles present in the wastepaper suspension after the defibration stage (pulping) and separated from the fibers are attached to air bubbles by collector chemicals and transported by these to the surface of the flotation cell. The dirt-laden foam, which may also comprise fibers and fillers in addition to the impurities and polymer residues, is skimmed off. In order to reduce the fiber loss, the discharged foam is purified before the residue is disposed of after thickening. Usually, inter alia about 2% by weight of sodium hydroxide solution, about 1% by weight of hydrogen peroxide, about 3% by weight of waterglass and further additives in smaller proportions are used as chemical additives. All chemicals are dissolved together in water and added together to the defibrated (pulped) wastepaper suspension. In some recycling plants, the bleaching is carried out separately. It is now usual to subject the wastepaper suspension twice in succession to the flotation deinking process in order thus to achieve the best possible separation of the impurities and polymers from the paper fiber.

The wash deinking process is very widely used, especially in North America. In contrast to flotation, the washing is a dewatering and thickening process. The polymer particles which are detached from the fibers and as small as possible must be thoroughly dispersed so that no further attachment to the fibers can take place during the dewatering of the suspension. For this purpose, the prescribed pH range must be very exactly maintained throughout the process. The dewatering is usually effected in a multistage process, the resulting filtrates, which comprise the detached polymer particles in great dilution, being separated off. A disadvantage of the wash deinking process is that the filler and fiber discharge is substantially higher than in the flotation.

As mentioned above, the method according to the invention in the embodiment c) is possible in both deinking processes. What is essential to the invention is that the wastepaper suspension be initially taken in an alkaline medium and subjected in this form to the deinking process. Alkaline medium means that the wastepaper suspension has a pH from 8, preferably from 8 to 12, particularly preferably from 10 to 12.

The bases described above are suitable for adjusting the pH, sodium hydroxide solution being particularly preferably used.

Here too, it is particularly advantageous that the biodegradable polymers dissolve in the alkaline medium and thus almost completely separate from the paper fiber.

The method according to the invention is preferably carried out in only one of the embodiments a), b) or c) described. However, it is also possible to carry out any desired combinations of at least two embodiments. As a rule, however, one of said embodiments is sufficient for achieving complete separation of the biodegradable polymers from the paper fiber.

The present invention likewise relates to a method for sizing paper products, in which biodegradable polymers are used as the polymeric size. These biodegradable polymers are suitable both as engine sizes and as surface sizes.

As engine sizes, the biodegradable polymers are added to the paper stock prior to sheet formation. The biodegradable polymers can be added to the high-consistency stock (fiber concentration >15 g/l, for example in the range from 25 to 40 g/l up to 60 g/l) or to the low-consistency stock (fiber concentration <15 g/l, for example in the range from 5 to 12 g/l). The point of addition is preferably before the sheet formation but may be between a shear stage and a screen or thereafter. As engine sizes, amounts of biodegradable polymer in the range from 0.05 to 1% by weight, preferably from 0.1 to 0.6% by weight, in each case solid, based on dry paper stock, are usually used.

With the use of the biodegradable polymers as surface sizes, they can be processed in all suitable methods for surface sizing. The polymers can be applied to the surface of the paper to be sized, for example, with a size press, a film press or a gate-roll applicator. For use, the polymers are usually added to the size press liquor in an amount of from 0.01 to 3% by weight, preferably from 0.05 to 1% by weight, in each case solid, based on dry paper stock, and depend on the desired degree of sizing of the papers to be finished. Furthermore, the size press liquor may comprise further substances, such as, for example, starch, pigments, dyes, optical brighteners, biocides, paper strength agents, fixing agents, antifoams, retention aids and/or drainage aids. The amounts of biodegradable polymer which are applied to the surface of paper products are, for example, from 0.005 to 3.0 g/m$^2$, preferably from 0.01 to 1 g/m$^2$.

As sizes, whether as engine sizes or surface sizes, the biodegradable polymers show a sizing effect comparable with known polymeric sizes. Compared with the known paper products, however, the paper products sized in this manner have the advantage that they are accessible to a recycling method in which the paper fibers can be completely reclaimed.

The present invention therefore also relates to a paper product sized with biodegradable polymers.

The present invention comprises a method for recycling paper products sized and/or coated with biodegradable polymers, and a method for sizing paper products with biodegradable polymers.

In the context of the present invention, the feature "biodegradable" is fulfilled for a substance or a mixture of substances when this substance or the mixture of substances has a percentage degree of biodegradation of at least 90%, according to DIN EN 13432.

In general, the result of the biodegradability is that the polymers and polymer mixtures (also shortened below to polymer (mixtures)) disintegrate in an appropriate and detectable timespan. The degradation can take place enzymatically, hydrolytically, oxidatively and/or by the action of electromagnetic radiation, for example UV radiation, and is generally effected for the predominant part by the action of microorganisms, such as bacteria, yeasts, fungi and algae. The biodegradability can be quantified, for example, by mixing the polymer (mixtures) with compost and storing them for a certain time. For example, according to DIN EN 13432, $CO_2$-free air is allowed to flow through matured compost during the composting and this treated compost is subjected to a defined temperature program. The biodegradability is defined here by the ratio of the net $CO_2$ release of the sample (after subtraction of the $CO_2$ release by the compost without sample) to the maximum $CO_2$ release of the sample (calculated from the carbon content of the sample) as a percentage degree of biodegradation. Biodegradable polymer (mixtures) show as a rule substantial degradation phenomena, such as fungal growth, cracking and hole formation, after only a few days of composting.

Other methods for determining the biodegradability are described, for example, in ASTM D 5338 and ASTM D 6400-4.

Paper products which are coated with biodegradable polymer (mixtures) are disclosed in the prior European application with the application number EP 09010388.8.

These are as a rule multilayered coatings, usually from 2 to 7 layers and preferably 2 or 3 layers being used in the paper coating. For such coated paper products and the production thereof, reference is made at this point expressly to the prior European application with the application number EP 09010388.8.

Biodegradable polymers are already known to the person skilled in the art and are disclosed, inter alia, in Ullmann's Encyclopedia of Industrial Chemistry (online version 2009), Polymers, Biodegradable, Wiley-VCH Verlag GmbH & Co. KG, Weinheim, 2009, page 131. In particular, the definition of biodegradable polymers in the context of the present invention covers biodegradable, aliphatic-aromatic polyesters as described in the prior European application with the application number EP 09010388.8.

In the recycling method according to the invention, paper products which are coated with a polyester having a melt volume rate (MVR) according to EN ISO 1133 (190° C., 2.16 kg weight) of from 2 to 50 $cm^3/10$ min and/or polymer mixtures comprising such polyesters are suitable.

Paper products which are coated with a polyester having a melt volume rate (MVR) according to EN ISO 1133 (190° C., 2.16 kg weight) of from 5 to 25 $cm^3/10$ min and particularly preferably from 5 to 12 $cm^3/10$ min are particularly suitable.

Of course, paper products which are coated with polymer mixtures of the polyesters with other biodegradable polymers, such as, in particular, polylactic acid, can also be recycled. It has proven advantageous that these polymers too have high flowability.

For example, polylactic acid having a melt volume rate (MVR) according to EN ISO 1133 (190° C., 2.16 kg weight) of from 5 to 70 $cm^3/10$ min, particularly preferably from 9 to 50 $cm^3/10$ min and especially preferably from 5 to 25 $cm^3/10$ min has proven useful as a mixing component in such polymer mixtures. Furthermore, mixtures of flowable polyesters with the abovementioned flowable polymer mixtures are suitable for paper coating.

Partly aromatic polyesters based on aliphatic diols and aliphatic/aromatic dicarboxylic acids are also understood as meaning polyester derivatives, such as polyetheresters, polyesteramides or polyetheresteramides. The partly aromatic polyesters include linear polyesters whose chains have not been extended (WO 92/09654 A1). In particular, aliphatic/aromatic polyesters of butanediol, terephthalic acid and aliphatic $C_6$-$C_{18}$-dicarboxylic acids, such as adipic acid, suberic acid, azelaic acid, sebacic acid and brassylic acid (for example as described in WO 2006/097353 to 56) are suitable mixing components. Chain-extended and/or branched partly aromatic polyesters are preferred. The latter are disclosed in documents WO 96/15173 to 15176, 21689 to 21692, 25446, 25448 or WO 98/12242, which are hereby incorporated by reference. Mixtures of different partly aromatic polyesters are also suitable for the coating of paper products.

Biodegradable, aliphatic-aromatic polyesters as sizes and/or coatings for paper products are preferably understood as meaning those which comprise i) from 40 to 70 mol %, based on the components i to ii, of one or more dicarboxylic acid derivatives or dicarboxylic acids selected from the group consisting of succinic acid, adipic acid, sebacic acid, azelaic acid and brassylic acid,
ii) from 60 to 30 mol %, based on the components i to ii, of a terephthalic acid derivative,
iii) from 98 to 102 mol %, based on the components i to ii, of a $C_2$-$C_8$-alkylenediol or $C_2$-$C_6$-oxyalkylenediol,
iv) from 0.00 to 2% by weight, based on the total weight of the components i to iii, of a chain extender and/or crosslinking agent selected from the group consisting of a di- or polyfunctional isocyanate, isocyanurate, oxazoline, epoxide, carboxylic anhydride and/or an at least trifunctional alcohol or an at least trifunctional carboxylic acid,
v) from 0.00 to 50% by weight, based on the total weight of the components i to iv, of an organic filler selected from the group consisting of native or plasticized starch, natural fibers, sawdust and/or an inorganic filler selected from the group consisting of chalk, precipitated calcium carbonate, graphite, gypsum, conductive carbon black, iron oxidem, calcium chloride, dolomite, kaolin, silicon dioxide (quartz), sodium carbonate, titanium dioxide, silicate, wollastonite, mica, montmorillonite, talc, glass fibers and mineral fibers and
vi) from 0.00 to 2% by weight, based on the total weight of the components i to iv, of at least one stabilizer, nucleating agent, lubricant and release agent, surfactant, wax, antistatic agent, antifogging agent, dye, pigment, UV absorber, UV stabilizer or other plastics additive and have a melt volume rate (MVR) according to EN ISO 1133 (190° C., 2.16 kg weight) of from 3 to 50 $cm^3/10$ min.

As described above, the biodegradable, aliphatic-aromatic polyesters are disclosed from the prior European application with the application number EP 09010388.8. This document, as well as the literature cited therein, is hereby incorporated by reference both for the composition of these polyesters and for the method for the preparation thereof.

Among the compounds described there, preferred copolymer mixtures are those which comprise (a) from 5 to 95% by weight, preferably from 30 to 90% by weight, particularly preferably from 40 to 70% by weight, of a biodegradable, aliphatic-aromatic polyester and
(b) from 95 to 5% by weight, preferably from 70 to 10% by weight, particularly preferably from 60 to 30% by weight, of one or more polymers selected from the group consisting of polylactic acid, polycaprolactone, polyhydroxyalkanoate, chitosan and gluten and one or more polyesters based on aliphatic diols and aliphatic/aromatic dicarboxylic acids, such as, for example, polybutylene succinate (PBS), polybutylene succinate adipate (PBSA), polybutylene succinate sebacate (PBSSe), polybutylene terephthalate-co-adipate (PBTA), and (c) from 0 to 2% by weight of a compatibilizer.

Compatibilizers of group (c) are carboxylic anhydrides, such as maleic anhydride, and in particular copolymers containing epoxide groups and based on styrene, acrylates and/or methacrylates. The units carrying epoxide groups are preferably glycidyl (meth)acrylates. Copolymers of the abovementioned type which contain epoxide groups are marketed, for example, by BASF Resins B.V. under the brand Joncryl® ADR. The particularly suitable compatibilizer is, for example, Joncryl® ADR 4368.

Particularly preferred copolymer mixtures therefore comprise
(a) from 20 to 90% by weight, preferably from 30 to 50% by weight, particularly preferably from 35 to 45% by weight, of a biodegradable, aliphatic-aromatic polyester,
(b) from 80 to 10% by weight, preferably from 70 to 50% by weight, particularly preferably from 65 to 55% by weight, of one or more polymers selected from the group consisting of polylactic acid and polyhydroxyalkanoate and
(c) from 0 to 2% by weight of an epoxide-containing poly (meth)acrylate.

The preferred polylactic acid of group (b) is one which has the following property profile:
a melt volume rate MVR at 190° C. and 2.16 kg according to EN ISO 1133 of from 0.5 to 100 ml/10 min, preferably from 5 to 70 ml/10 min, particularly preferably from 9 to 50 ml/10 min,
a melting point below 240° C.,
a glass transition temperature (Tg) of greater than 55° C.,
a water content of less than 1000 ppm,
a residual monomer content (lactide) of less than 0.3% by weight and
a molecular weight greater than 10 000 Dalton.

Preferred polylactic acids are, for example, NatureWorks® 6201 D, 6202 D, 6251 D, 3051 D and in particular 3251 D (polylactic acid from NatureWorks).

Polyhydroxyalkanoates of group (b) are primarily understood as meaning poly-4-hydroxybutyrates and poly-3-hydroxybutyrates; copolyesters of the abovementioned hydroxybutyrates with 3-hydroxyvalerates or 3-hydroxyhexanoates are furthermore included. Poly-3-hydroxybutyrate-co-4-hydroxybutyrates are known, in particular from Metabolix. They are marketed under the trade name Mirel®. Poly-3-hydroxybutyrate-co-3-hydroxyhexanoates are known from P&G or Kaneka. Poly-3-hydroxybutyrates are marketed, for example, by PHB Industrial under the brand name Biocycle® and by Tianan under the name Enmat®.

The polyhydroxyalkanoates have as a rule a molecular weight $M_w$ of from 100 000 to 1 000 000 Dalton and preferably from 300 000 to 600 000 Dalton.

Such polymers and polymer mixtures are distinguished in that they are biodegradable and are suitable for coating paper products, as are suitable in the prior European application with the application number EP 0901388.8.

In addition, the polymers and polymer mixtures used in the method according to the invention in that they can be completely separated from the paper products sized and/or coated therewith, so that the paper product can be recycled.

In principle, the method according to the invention is suitable for all paper varieties which are sized and/or coated with biodegradable polymers. In particular, the method according to the invention is suitable for recycling of paper products which are sized and/or coated with biodegradable polymers and which can be used as paper products for food (e.g. for fresh products) which are coated on one or both sides,
paper bags for dry foods, such as, for example, coffee, tea, soup powder, gravy powder; for liquids, such as, for example, cosmetics, cleaning agents, beverages, dairy products,
tube laminates,
paper carrier bags,
paper laminates and coextrudates for ice cream, confectionary (e.g. chocolate bars and muesli bars),
paper adhesive tape,
cardboard cups (e.g. paper cups for cold and hot beverages), yoghurt pots,
meal trays,
wound cardboard containers (cans, drums),
wet-strength or moisture-resistant cartons for outer packagings (wine bottles, food),
fruit boxes of coated cardboard,
fast food plates,
clamp shells,
beverage cartons and cartons for liquids, such as detergents and cleaning agents, frozen food cartons, ice packagings (e.g. ice cups, wrapping material for conical ice cream wafers),
paper labels and sleeves,
flowerpots and plant pots,
specialty papers (sand papers, filter papers).

The following examples are intended to illustrate the present invention but not limit it.

EXAMPLES

The following papers which were produced from 100% chemical pulp by the method as described in the prior European application with the application number EP 09010388.8 were used in the examples. These papers have a thickness of in each case 400 µm and were coated with different polymers (all MVR values used below are determined according to EN ISO 1133 (190° C., 2.16 kg weight)):

Paper 1
Paper coated with Ecoflex® FBX7011 (polybutylene adipate-co-terephthalate having an MVR of about 3 cm³/10 min, from BASF SE), layer thickness 20 µm Paper 2
Paper coated with Ecoflex® FS (polybutylene sebacate-co-terephthalate having an MVR of about 3 cm³/10 min, from BASF SE), layer thickness 20 µm Paper 3
Paper coated with a mixture of 55% of Ecoflex® FBX7011 and 45% of polylactic acid, having an MVR of 10 cm³/10 min, from BASF SE, layer thickness 20 µm Paper 4
Paper coated with Ecoflex® FBX7011 (from BASF SE), layer thickness 50 µm Paper 5
Paper coated with a mixture of 55% of Ecoflex® FBX7011 and 45% of polylactic acid, having an MVR of 10 cm³/10 min, from BASF SE, layer thickness 40 µm Comparative Paper 1
Paper coated with polyethylene, layer thickness 20 µm

Example 1

In each case 4 g of the papers described (about 1×1 cm$^2$) and 100 ml of aqueous solution (comprising 1% by weight of sodium hydroxide solution and 2% by weight of sodium silicate) are vigorously stirred (stirring speed 300 rpm) at 50° C. in a 250 ml flask. The pH of the mixture was 10. In each case after 15 and after 30 min, the state of the test specimens was visually inspected. The results are summarized in Table 1.

TABLE 1

Recycling of paper coated with polymers, in an alkaline medium

|  | State after 15 min | State after 30 min |
|---|---|---|
| Paper 1 | A | A |
| Paper 2 | A | A |
| Paper 3 | A | A |
| Paper 4 | A | A |
| Paper 5 | A | A |
| Comparative paper 1 | B | B |

In Table 1, the meanings are as follows:
A=complete disintegration of the paper into pulp fiber, complete disintegration of the polymer films
B=complete disintegration of the paper into pulp fiber, no disintegration of the polymer films, film completely inert and floating.

Example 2

The following solutions were used:
Solution 1
0.1% strength by weight aqueous solution of lipase from *Candida antarctica*
Solution 2
0.1% strength by weight aqueous solution of lipase from *Rhizopus arrhizus*
In each case 4 g of the papers described (about 1×1 cm$^2$) and in each case 100 ml of one of the aqueous lipase solutions described were stirred (stirring speed 100 rpm) at 40° C. in a 250 ml flask. In each case after 30 min and after 1 hour, the state of the test specimens was visually inspected. The results are summarized in Table 2.

TABLE 2

Recycling of paper coated with polymers, in the presence of a lipase

|  | State after 15 min | State after 30 min |
|---|---|---|
| Paper 1, solution 1 | A | A |
| Paper 1, solution 2 | A | A |
| Paper 2, solution 1 | A | A |
| Paper 2, solution 2 | A | A |
| Paper 3, solution 1 | A | A |
| Paper 3, solution 2 | A | A |
| Paper 4, solution 1 | A | A |
| Paper 4, solution 2 | A | A |
| Paper 5, solution 1 | A | A |
| Paper 5, solution 2 | A | A |
| Comparative paper 1, solution 1 | B | B |
| Comparative paper 1, solution 2 | B | B |

In Table 2, the meanings are as follows:
A=detachment of the polymer film from the paper, complete disintegration of the polymer films
B=no change, paper still coated with polymer film merely partially detached but not disintegrated

The invention claimed is:

1. A method for recycling a paper product sized, coated, or both sized and coated with a polymer, comprising:
    pulping an aqueous wastepaper suspension comprising a paper product in the presence of a hydrolase, said paper product being a paper product sized and/or coated with a polyester to obtain an aqueous solution, which is a wastepaper suspension comprising a mixture of paper fibers and said polyester, and
    separating said polyester from the wastepaper suspension to recycle said paper fibers of said paper product,
    wherein said polyester is a polyester having a melt flow rate according to EN ISO 1133 (190° C., 2.16 kg weight) of from 2 to 50 cm$^3$/10 min, and
    said hydrolase comprises at least one of a carboxyesterase [3.1.1.1], a lipase [3.1.1.3], and a cutinase (3.1.1.74).

2. The method of claim 1,
    wherein the hydrolase comprises a lipase, cutinase, or both from *Achromobacter* sp., *Aspergillus* sp., *Candida* sp., *Candida antarctica*, *Mucor* sp., *Penicilium* sp., *Geotricum* sp., *Rhizopus* sp., *Rhizopus arrhizus*, *Burkholderia* sp., *Pseudonomas* sp., *Pseudonomas cepacia*, *Thermomyces* sp., pig's pancreas, or wheat germs;
    the hydrolase comprises a carboxyesterase from *Bacillus* sp., *Pseudonomas* sp., *Burkholderia* sp., *Mucor* sp., *Saccharomyces* sp., *Rhizopus* sp., *Thermomonospora fusca*, *Thermobifida fusca*, *Fusarium solaini*, *Thermoanaerobium* sp., pig's liver, or horse's liver;
    or the hydrolase comprises a combination thereof.

3. The method of claim 1,
    wherein the hydrolase present during said pulping is added to the wastepaper suspension in the form of an aqueous solution, where a total amount of the hydrolase is from 0.001 to 40% by weight, based on the total amount of said aqueous solution.

4. The method of claim 1, further comprising:
    pulping the wastepaper suspension in a pulper or drum disintegrator.

5. The method of claim 1,
    wherein producing the wastepaper suspension comprises pulping in an alkaline medium, treating in an alkaline medium, or both, and
    a pH of the wastepaper suspension in the alkaline medium is from 8 to 12.

6. The method of claim 5, further comprising:
    adding at least one base selected from the group consisting of an alkali metal and an alkaline earth metal to the wastepaper suspension, thereby adjusting the pH.

7. The method of claim 1,
    wherein producing the wastepaper suspension comprises treating in an alkaline medium in a deinking process, and
    the deinking process is a flotation deinking process or a wash deinking process.

8. The method of claim 5,
    wherein the pH of the wastepaper suspension in the alkaline medium is from 8 to 11.

9. The method of claim 1, wherein the polyester comprises an aliphatic-aromatic polyester, the polyester comprising:
    i) from 40 to 70 mol % of at least one dicarboxylic acid derivative or dicarboxylic acid selected from the group consisting of succinic acid, adipic acid, sebacic acid, azelaic acid, and brassylic acid, based on a total content of dicarboxylic acid derivative, dicarboxylic acid, and terephthalic acid derivative,
    ii) from 60 to 30 mol %, of a terephthalic acid derivative, based on the total content of dicarboxylic acid derivative, dicarboxylic acid, and terephthalic acid derivative, iii) from 98 to 102 mol %, based on components i to ii, of a $C_2$-$C_8$-alkylenediol or $C_2$-$C_6$-oxyalkylenediol, iv) from 0.00 to 2% by weight, based on a total weight of components i to iii, of at least one chain extender or crosslinking agent selected from the group consisting of a di- or polyfunctional isocyanate, isocyanurate, oxazoline, epoxide, carboxylic anhydride, an at least trifunctional alcohol, and an at least trifunctional carboxylic acid, v) from 0.00 to 50% by weight, based on a total weight of components i to iv, of a filler selected from the group consisting of native or plasticized starch, a natural fiber, sawdust, chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, a glass fiber, and a mineral fiber, and vi) from 0.00 to 2% by weight, based on the total weight of components i to iv, of a stabilizer, nucleating agent, lubricant and release agent, surfactant, wax, antistatic agent, antifogging agent, dye, pigment, UV absorber, UV stabilizer, other plastics additive, or combination thereof, wherein the polyester has a melt volume rate (MVR) according to EN ISO 1133 (190° C., 2.16 kg weight) of from 3 to 50 $cm^3$/10 min.

10. The method of claim 9, wherein the polyester is a copolymer mixture, the copolymer mixture comprising:

(a) from 5 to 95% by weight of the aliphatic-aromatic polyester, (b) a total of from 95 to 5% by weight of at least one polymer selected from the group consisting of polylactic acid, polycaprolactone, polyhydroxyalkanoate, chitosan, and gluten, and at least one polyester based on an aliphatic diol and an aliphatic/aromatic dicarboxylic acid, and (c) from 0 to 2% by weight of a compatibilizer.

* * * * *